(12) United States Patent
Kuwata (10) Patent No.: US 8,645,818 B2
(45) Date of Patent: Feb. 4, 2014

(54) OUTPUT IMAGE DATA GENERATING DEVICE AND METHOD OF GENERATING OUTPUT IMAGE DATA

(75) Inventor: Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 717 days.

(21) Appl. No.: 12/806,142

(22) Filed: Aug. 6, 2010

(65) Prior Publication Data

US 2010/0303353 A1     Dec. 2, 2010

Related U.S. Application Data

(63) Continuation of application No. 10/939,161, filed on Sep. 9, 2004, now abandoned.

(30) Foreign Application Priority Data

Sep. 10, 2003   (JP) .................................. 2003-318056

(51) Int. Cl.
*G06F 17/00*         (2006.01)

(52) U.S. Cl.
USPC ......................................... 715/243; 715/200

(58) Field of Classification Search
USPC .................. 715/243, 255, 200, 204
See application file for complete search history.

(56) References Cited

U.S. PATENT DOCUMENTS

| | | | |
|---|---|---|---|
| 5,982,926 A * | 11/1999 | Kuo et al. ..................... | 382/167 |
| 6,137,483 A | 10/2000 | Kiyono et al. | |
| 6,324,545 B1 | 11/2001 | Morag | |
| 6,906,826 B1 | 6/2005 | Kuwata et al. | |
| 7,213,202 B1 | 5/2007 | Kagle | |
| 7,251,357 B2 * | 7/2007 | Takemoto ..................... | 382/162 |
| 7,298,931 B2 | 11/2007 | Kim et al. | |
| 7,433,518 B2 | 10/2008 | Shiratani | |
| 8,249,382 B2 * | 8/2012 | Teshima et al. ............... | 382/276 |
| 8,452,100 B2 * | 5/2013 | Yoshino et al. ............... | 382/190 |
| 2002/0163535 A1 | 11/2002 | Mitchell et al. | |
| 2002/0168106 A1 | 11/2002 | Trajkovic | |

(Continued)

FOREIGN PATENT DOCUMENTS

| | | |
|---|---|---|
| DE | 197 32 241 | 2/1998 |
| JP | 02-143873 | 6/1990 |

(Continued)

OTHER PUBLICATIONS

Abstract of Japanese Patent Publication No. 02-143873, Pub. Date: Jun. 1, 1990, Patent Abstracts of Japan.

(Continued)

*Primary Examiner* — Manglesh M Patel
(74) *Attorney, Agent, or Firm* — Martine Penilla Group, LLP (57) ABSTRACT

A CPU selects multiple objective image data to be pasted on ornamental image data, analyzes the selected multiple objective image data, and rates the image qualities of the respective image data. The CPU specifies the number of plural layout locations included in the ornamental image data and the priority order of the plural layout locations, and allocates the multiple objective image data to the plural layout locations in the ornamental image data, based on the specified priority order and the ratings of the multiple objective image data. The CPU executes image quality adjustment with regard to the multiple objective image data allocated to the plural layout locations and pastes the quality-adjusted image data on the ornamental image data according to layout control information, so as to generate resulting output image data.

11 Claims, 6 Drawing Sheets

| | Image data | | |
|---|---|---|---|
| Image Quality Adjustment Parameters | GD1 | GD2 | GD3 |
| Contrast | 77 | 88 | 92 |
| Brightness | 80 | 92 | 85 |
| Color Balance | 86 | 95 | 83 |
| Chroma/Saturation | 90 | 96 | 81 |
| Sharpness | 84 | 95 | 86 |
| Total Evaluation Value | 417 | 466 | 427 |
| Rating | 3 | 1 | 2 |

(56) References Cited

U.S. PATENT DOCUMENTS

| | | |
|---|---|---|
| 2003/0004997 A1 | 1/2003 | Parker et al. |
| 2005/0094206 A1 | 5/2005 | Tonisson |
| 2008/0317354 A1 | 12/2008 | Shiratani |

FOREIGN PATENT DOCUMENTS

| | | |
|---|---|---|
| JP | 10-232916 | 9/1998 |
| JP | 10-293856 | 11/1998 |
| JP | 11-328403 | 11/1999 |
| JP | 2000-090281 | 3/2000 |
| JP | 2000-155835 | 6/2000 |
| JP | 2000-165647 | 6/2000 |
| JP | 2000-215306 | 8/2000 |
| JP | 2002-358522 | 12/2002 |

OTHER PUBLICATIONS

Viswanath Poosala et al., "Selectivity Estimation Without the Attribute Value Independence Assumption," *Proc. of the 23rd Int. Conf. on Very Large Databases*, Athens, Greece, 1997, pp. 486-495 (XP002398846).
Abstract of German Patent Publication No. 197 32 241 Pub. Date: Feb. 5, 1998, retrieved from the Internet (esp@cenet database).
Abstract of Japanese Patent Publication No. 10-293856, Pub. Date: Nov. 4, 1998, Patent Abstracts of Japan.
Abstract of Japanese Patent Publication No. 11-328403, Pub. Date: Nov. 30, 1999, Patent Abstracts of Japan.
Abstract of Japanese Patent Publication No. 2000-090281, Pub. Date: Mar. 31, 2000, Patent Abstracts of Japan.
Abstract of Japanese Patent Publication No. 2000-155835, Pub. Date: Jun. 6, 2000, Patent Abstracts of Japan.
Abstract of Japanese Patent Publication No. 2000-165647, Pub. Date: Jun. 16, 2000, Patent Abstracts of Japan.
Malcolm Slaney et al., "Multimedia Edges: Finding Hierarchy in all Dimensions," *Proc. of the 9th ACM Int. Conf. on Multimedia*, Ottawa, Ontario, Sep. 30-Oct. 5, 2001, pp. 29-40 (XP002295016).
Abstract of Japanese Patent Publication No. 2002-358522, Pub. Date: Dec. 13, 2002, Patent Abstracts of Japan.

* cited by examiner

| Image Quality Adjustment Parameters | Image data | | |
|---|---|---|---|
| | GD1 | GD2 | GD3 |
| Contrast | 77 | 88 | 92 |
| Brightness | 80 | 92 | 85 |
| Color Balance | 86 | 95 | 83 |
| Chroma/Saturation | 90 | 96 | 81 |
| Sharpness | 84 | 95 | 86 |
| Total Evaluation Value | 417 | 466 | 427 |
| Rating | 3 | 1 | 2 |

Fig.8

| Layout Location | Priority Order | Image data |
|---|---|---|
| A | 2 | GD3 |
| B | 1 | GD2 |
| C | 3 | GD1 |

Fig.9

| | Image data | | | | |
|---|---|---|---|---|---|
| | GD1 | GD2 | GD3 | GD4 | GD5 |
| Total Evaluation Value | 417 | 466 | 427 | 402 | 445 |
| Rating | 4 | 1 | 3 | 5 | 2 |

Fig.10

| Layout Location | Priority Order | Image data |
|---|---|---|
| A | 2 | GD5 |
| B | 1 | GD2 |
| C | 3 | GD3 |

OUTPUT IMAGE DATA GENERATING DEVICE AND METHOD OF GENERATING OUTPUT IMAGE DATA

CROSS REFERENCE TO RELATED APPLICATION

This application is a continuation of U.S. application Ser. No. 10/939,161, filed on Sep. 9, 2004 now abandoned. The disclosure of this prior application from which priority is claimed is incorporated herein by reference for all purposes.

BACKGROUND OF THE INVENTION

1. Field of Technology

The present invention relates to a technique of generating output image data, based on ornamental image data that gives some ornamental effect to objective image data and layout control information that specifies layout locations and layout dimensions of respective objective image data to be laid out on the ornamental image data.

2. Description of the Related Art

There are some practical techniques of pasting objective image data, for example, image data taken by an imaging device, on ornamental image data, for example, frame image data, to output a resulting output image including objective images surrounded by an ornamental image on a medium, such as paper. This technique uses layout control information including a script that describes layout locations and layout dimensions of the objective image data laid out on the ornamental image data.

The layout control information is related to the ornamental image data. In response to the user's selection and layout of objective image data on ornamental image data, this technique pastes the objective image data resized to preset dimensions at preset locations in the ornamental image data and thereby generates a resulting output image including the objective images surrounded by the ornamental image.

This prior art technique requires the user to select and lay out all the objective image data on the ornamental image data. The selection and layout of a large number of objective image data takes a relatively long time. It is not easy for the standard user to determine the effective layout of objective image data on ornamental image data. A technique of easily and impressively laying out objective image data on ornamental image data is thus highly demanded.

SUMMARY OF THE INVENTION

The object of the invention is thus to readily and impressively lay out multiple objective image data in layout locations on ornamental image data.

In order to attain at least part of the above and the other related objects, the present invention is directed to an output image data generating device that generates output image data from multiple objective image data and ornamental image data according to layout control information, which specifies layout locations and layout dimensions of the multiple objective image data to be laid out on the ornamental image data. The output image data generating device includes: an image data acquisition module that obtains the multiple objective image data; a ornamental image data acquisition module that obtains one or plurality of the ornamental image data; an image analysis module that analyzes each of the obtained multiple objective image data; a layout location assignment module that allocates the multiple objective image data to plural layout locations included in the obtained ornamental image data, based on a result of the analysis; and an output image data generation module that generates output image data from the multiple objective image data and the ornamental image data, according to the layout control information and the allocation of the respective objective image data to the plural layout locations.

The output image data generating device of the invention analyzes each of the obtained multiple objective image data, allocates the multiple objective image data to the plural layout locations in the ornamental image data based on the result of the analysis, and generates resulting output image data from the multiple objective image data and the ornamental image data according to the layout control information and the allocation of the objective image data to the layout locations. This arrangement ensures easy and impressive layout of multiple objective image data in respective layout locations on ornamental image data, according to a result of analysis of the multiple objective image data.

In one preferable aspect of the output image data generating device of the invention, the image analysis module rates image qualities of the obtained multiple objective image data, and the layout location assignment module sequentially allocates the multiple objective image data to the plural layout locations included in the ornamental image data in a descending order of the ratings.

The output image data generating device of this aspect rates the image qualities of the respective objective image data, sequentially allocates the objective image data to the layout locations in the ornamental image data in the descending order of the ratings, and generates resulting output image data from the multiple objective image data and the ornamental image data according to the layout control information and the allocation of the objective image data to the layout locations. This arrangement ensures easy and impressive layout of multiple objective image data in respective layout locations on ornamental image data.

In another preferable aspect of the invention, the output image data generating device further includes: a correction value setting module that analyzes each of the multiple objective image data allocated to one of the plural layout locations and sets a correction value with regard to the objective image data; and an image quality adjustment module that executes image quality adjustment of each objective image data with the setting of the correction value. The output image data generation module generates the output image data from the multiple objective image data that has gone through the image quality adjustment. The output image data generating device of this aspect executes image quality adjustment of each objective image data with the correction value set according to the result of analysis of the objective image data, thus generating output image data including higher-quality objective image data.

In the output image data generating device of this aspect, the correction value setting module may analyze each of the multiple objective image data to obtain a characteristic value of the objective image data with regard to an image quality-relating parameter and set the correction value of the objective image data, in order to cancel out or at least reduce a difference between the characteristic value and a preset reference value with regard to the image quality-relating parameter. This arrangement sets the correction value, based on the characteristic value corresponding to the result of analysis of each objective image data and the preset reference value of the image quality-relating parameter and thus preferably implements auto image quality adjustment.

In another preferable aspect of the output image data generating device of the invention, the layout location assignment module sequentially allocates the multiple objective image data to the plural layout locations in the ornamental image data until all the plural layout locations of the ornamental image data are occupied. Allocation of objective image data to one layout location is repeatedly carried out until all the layout locations included in the ornamental image data are occupied.

In still another preferable aspect of the output image data generating device of the invention, the layout control information additionally specifies a priority order of the plural layout locations, and the layout location assignment module sequentially allocates objective image data having a better result of analysis to a layout location having a higher priority in the ornamental image data.

The output image data generating device of this aspect sequentially allocates the objective image data of the higher rating to the layout location of the higher priority in the ornamental image data, and generates resulting output image data from the multiple objective image data and the ornamental image data according to the layout control information and the allocation of the objective image data to the layout locations. This arrangement ensures easy layout of multiple objective image data in respective layout locations on ornamental image data. This arrangement allocates the higher-quality objective image data to the important layout locations or the main layout locations in the ornamental image data, thus generating impressive output image data.

In another preferable aspect of the output image data generating device of the invention, the image analysis module computes statistical values of each of the multiple objective image data with regard to contrast, brightness, color balance, chroma/saturation, and sharpness, evaluates the image quality of the objective image data based on the computed statistical values and preset reference values with regard to the contrast, the brightness, the color balance, the chroma/saturation, and the sharpness, and gives a better result of analysis to a smaller difference between the statistical value and the preset reference value.

In the output image data generating device of the invention, a higher priority may be given to a layout location having greater layout dimensions or given to a layout location that is placed closer to a center of the ornamental image data. This arrangement allocates the more prominent objective image data to the layout locations of the higher priorities on the ornamental image data and thereby generates impressive output image data. The larger size of the objective image data, which is greatly affected by the image quality adjustment, is pasted in the layout location having the greater layout dimensions. The central area of the ornamental image data is noticeable and is accordingly required to have good impression by the image quality adjustment.

In another preferable aspect of the invention, the output image data generating device further includes a modification module that changes at least either selection of the objective image data to be laid out in the layout locations in the ornamental image data or the allocation of the multiple objective image data to the plural layout locations executed by the layout location assignment module. This arrangement enables the selection of the objective image data and the allocation of the respective objective image data to the layout locations in the ornamental image data to be changed according to the user's demands.

The present invention is also directed to an output image data generating method that generates output image data from multiple objective image data and ornamental image data according to layout control information, which specifies layout locations and layout dimensions of the multiple objective image data to be laid out on the ornamental image data. The output image data generating method obtains the multiple objective image data; obtains one or plurality of the ornamental image data; analyzes each of the obtained multiple objective image data; allocates the multiple objective image data to plural layout locations included in the obtained ornamental image data, based on a result of the analysis; and generates output image data from the multiple objective image data and the ornamental image data, according to the layout control information and the allocation of the respective objective image data to the plural layout locations.

The output image data generating method of the invention has the same functions and effects as those of the output image data generating device of the invention described above. The diversity of arrangements adopted to the output image data generating device are also applicable to the output image data generating method.

The output image data generating method of the invention is also actualized by a corresponding output image data generating program and a computer readable recording medium in which the output image data generating program is recorded.

DETAILED DESCRIPTION OF THE PREFERRED EMBODIMENTS

First Embodiment

The output image data generating device and the corresponding output image data generating method of the invention are described according to one embodiment with the attached drawings.

Figure 1:
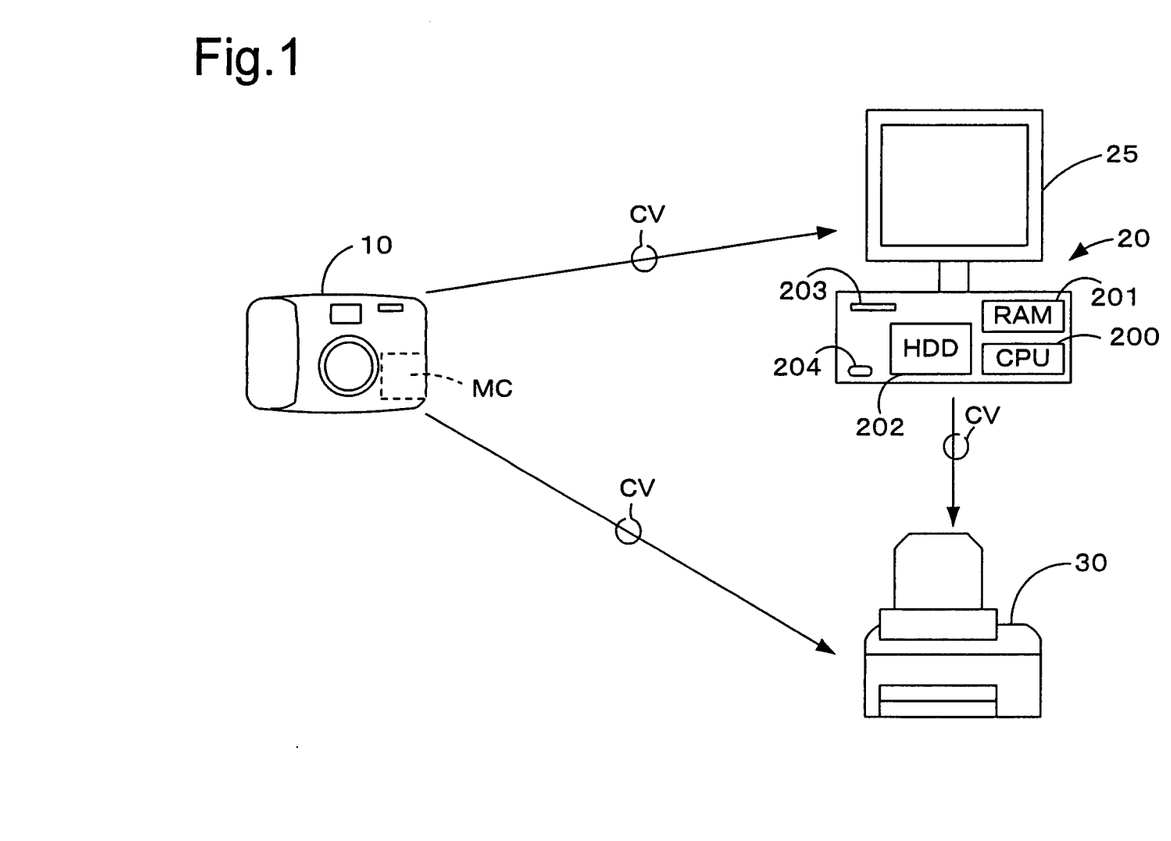
FIG. 1 schematically illustrates the configuration of an image processing system including an output image data generating device in a first embodiment.

An image processing system including an output image data generating device of the embodiment is described with reference to FIG. 1. FIG. 1 schematically illustrates the configuration of the image processing system including the output image data generating device of the embodiment.

The image processing system includes a digital still camera 10 functioning as an input device to generate image data, a personal computer 20 functioning as the output image data generating device to execute a series of image processing with regard to input image data generated by the digital still camera 10 and output the processed image data as output image data, and a color printer 30 functioning as an output device to output a processed image corresponding to the output image data. The color printer 30 may have the output data generating functions of the personal computer 20. In this case, the stand-alone color printer 30 carries out both the image processing and the image output. The output device is not restricted to the color printer 30 but may be a monitor 25, such as a CRT display or an LCD display, or a projector. In the description below, the color printer 30 connected with the personal computer 20 is used as the output device.

The personal computer 20 is a general computer and includes a central processing unit (CPU) 200 that executes a objective image data evaluation process and an output image data generation process with layout control information LI, a random access memory (RAM) 201 that temporarily stores various data including input image data, and a hard disk drive (HDD) 202 (or a read only memory (ROM)) that stores programs and reference tables for execution of the objective image data evaluation process and the output image data generation process with the layout control information LI. The personal computer 20 additionally has a memory card slot 203 to receive a memory card MC inserted therein and input and output terminals 204 connected with connection cables from, for example, the digital still camera 10.

The digital still camera 10 focuses light information on a digital device (a photoelectric conversion element, such as a CCD or a photoelectron multiplier) to take an image. The digital still camera 10 includes a photoelectric conversion circuit with a CCD to convert light information into analog electric signals, an image acquisition circuit to control the photoelectric conversion circuit and obtain a digital image, and an image processing circuit to process the obtained digital image. The digital still camera 10 stores the obtained digital image data into the memory card MC as a storage device. The JPEG format for lossy compression storage and the TIFF format for lossless compression storage are typically used to store image data taken by the digital still camera 10, although other storage formats, such as RAW format, GIF format, and BMP format may be adoptable.

The digital still camera 10 writes imaging information, which is set at each time of imaging and describes imaging conditions, and image processing control information GI, which is stored in advance in a memory (for example, a ROM) of the digital still camera 10, into a header of image data (objective image data) in the process of generation of image data and stores the generated image data into the memory card MC. The digital still camera 10 also stores ornamental image data FD, which gives some ornamental effect to objective image data GD, and layout control information LI, which specifies layout locations, layout dimensions, and a priority order of the respective objective image data GD to be laid out on the ornamental image data FD and is related to the ornamental image data FD, in its memory and writes the ornamental image data FD and the layout control information LI together with the generated image data into the memory card MC. The digital still camera 10 may have the output image data generation functions of the personal computer 20. Direct connection of the digital still camera 10 having the output image data generation functions to the printer 30 enables an image corresponding to image data obtained by imaging to be output without the personal computer 20.

The ornamental image data FD is, for example, frame image data or album mounting image data on which multiple objective image data are pasted, and may be generated in the form of bitmap data or vector data. The layout control information LI has a script specifying the layout locations, the layout dimensions, and the priority order of the respective objective image data GD to be laid out on the ornamental image data FD in this embodiment. In the description below, the objective image data specified as layout objects are image data taken by an imaging device. The objective image data of layout objects are, however, not restricted to the image data taken by the imaging device but may be any image data mountable on the ornamental image data FD, for example, image data generated by computer graphics. The image processing control information GI includes pieces of information (commands) specifying experimentally obtained image quality adjustment conditions to enable a selected output device to give a desired output result of an image corresponding to image data generated by any selected image data generation device, such as the digital still camera 10. The image processing control information GI includes the settings of respective parameters for specifying the image quality adjustment conditions according to the combination of the digital still camera 10 and the selected output device (for example, the printer 30).

The image data generated by the digital still camera 10 is sent to the color printer 30 via a cable CV and the computer 20 or via only a cable CV. The image data taken by the digital still camera 10 may otherwise be stored in the memory card MC and given to the color printer 30 from the memory card MC, which is inserted into the memory card slot of the personal computer 20 or is directly connected to the color printer 30. In the description below, the personal computer 20 executes the output image data generation process with image data and ornamental image data and sends resulting output image data to the color printer 30.

The color printer 30 is capable of outputting color images and is, for example, an inkjet printer that ejects four color inks, cyan (C), magenta (M), yellow (Y), and black (K), onto a printing medium to create a dot pattern and thereby form an image. The color printer 30 may be an electrophotographic printer that transfers and fixes color toners on a printing medium to form an image. Other color inks, light cyan (LC), light magenta (LM), and dark yellow (DY), may be used in addition to the above four color inks.

Image Processing by Personal Computer 20

Figure 2:
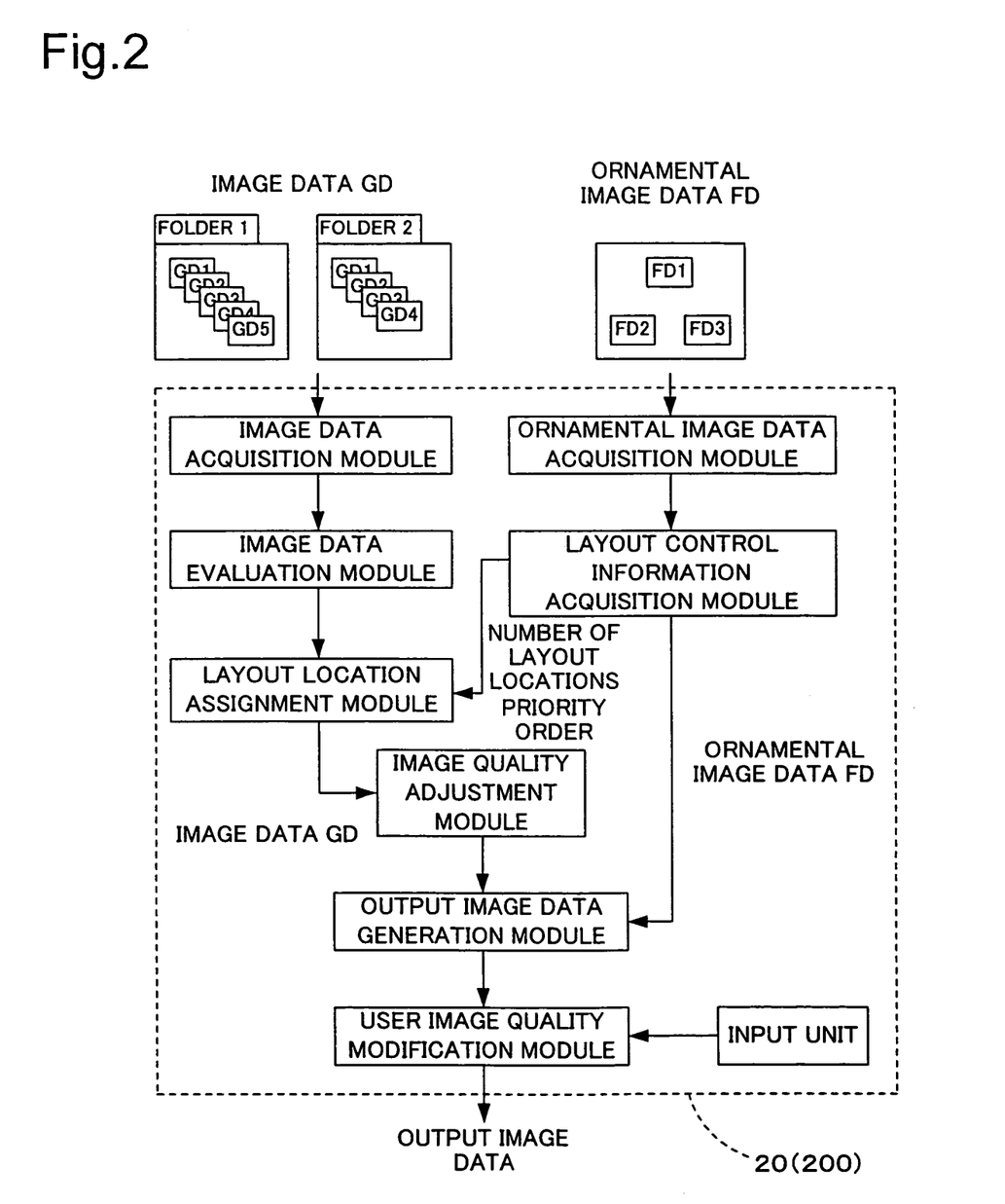
FIG. 2 is a functional block diagram showing the functions of a personal computer 20 (CPU 200) in the first embodiment.

The functional configuration of the personal computer 20 (CPU 200) is described with reference to FIG. 2. FIG. 2 is a functional block diagram showing the functions of the personal computer 20 (CPU 200) in this embodiment.

The personal computer 20 (CPU 200) has an image data acquisition module that selects multiple image data GD to be pasted on ornamental image data FD, from at least one of a folder 1 storing multiple image data GD1 to GD5 and a folder 2 storing multiple image data GD1 to GD4. An image data evaluation module analyzes each of the selected image data and evaluates the image quality of each image data based on the result of the analysis.

An ornamental image data acquisition module obtains one or multiple ornamental image data FD among stored ornamental image data FD1 to FD3. A layout control information acquisition module analyzes layout control information related to the obtained ornamental image data FD, extracts the number of layout locations and the priority order of the layout locations with regard to the obtained ornamental image data FD, and sends the extracted information to a layout location assignment module.

The layout location assignment module assigns the multiple image data GD to the layout locations of the ornamental image data FD, based on the priority order obtained by the layout control information acquisition module and the results of evaluation made by the image data evaluation module. The image data GD having the higher ratings are successively allocated to the layout locations having the higher priorities. When the number of the image data is greater than the number of the layout locations, allocation of the image data GD to the layout locations continues as long as there is any vacant layout location, and is terminated when all the layout locations are occupied. The remaining image data GD that have not been assigned to any layout locations are thus not mounted on the ornamental image data FD. When the number of the image data is less than the number of the layout locations, on the other hand, only the layout locations having the higher priorities in the ornamental image data FD are filled with the image data GD.

An image quality adjustment module executes an image quality adjustment process with regard to the image data FD assigned to the layout locations and sends the processed image data GD to an output image data generation module. The image quality adjustment process executed by the image quality adjustment module may automatically adjust the image quality, based on characteristic values obtained by analysis of the image data GD and reference values.

The output image data generation module pastes the processed image data GD received from the image quality adjustment module onto the ornamental image data FD obtained according to the layout control information by the layout control information acquisition module and generates resulting output image data. A user image quality modification module changes allocation of the image data to the layout locations by the layout location assignment module, in response to the user's instructions given via an input unit.

Figure 3:
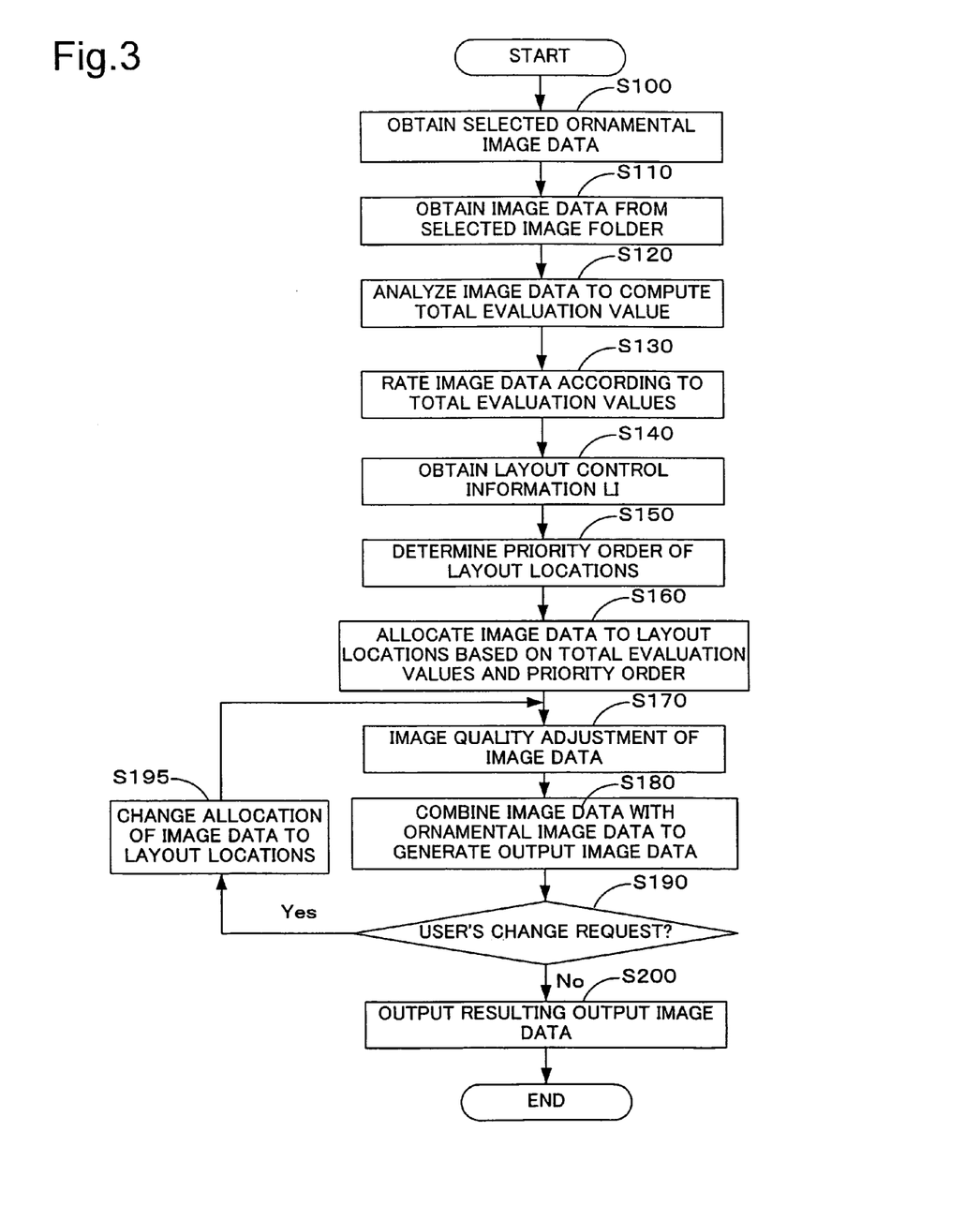
FIG. 3 is a flowchart showing a routine of output image data generation process executed by the personal computer 20 in the first embodiment.
Figure 4:
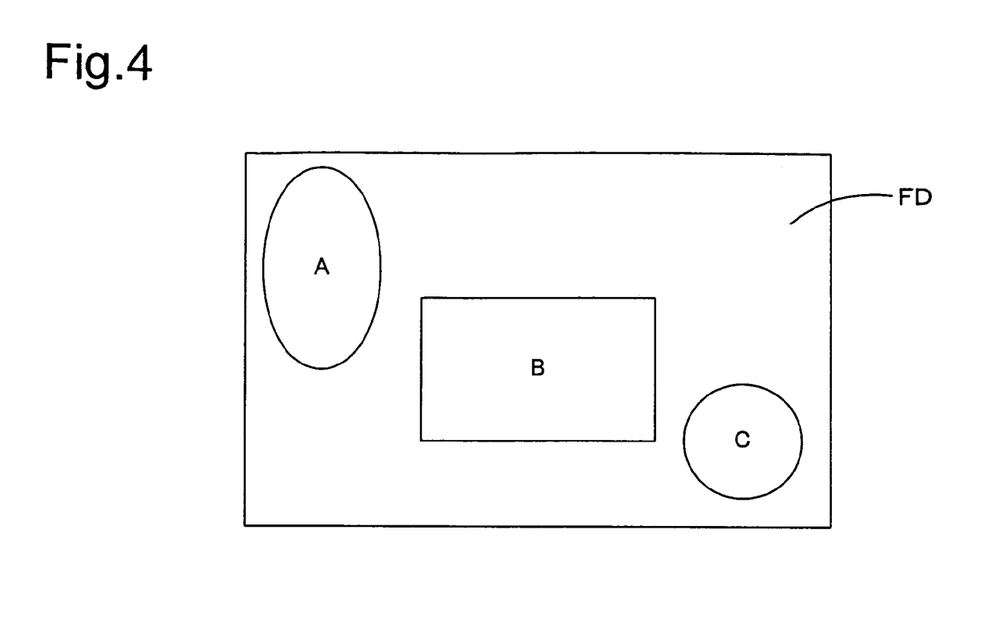
FIG. 4 shows layout locations and layout dimensions of image data laid out on ornamental image data.
Figure 5:
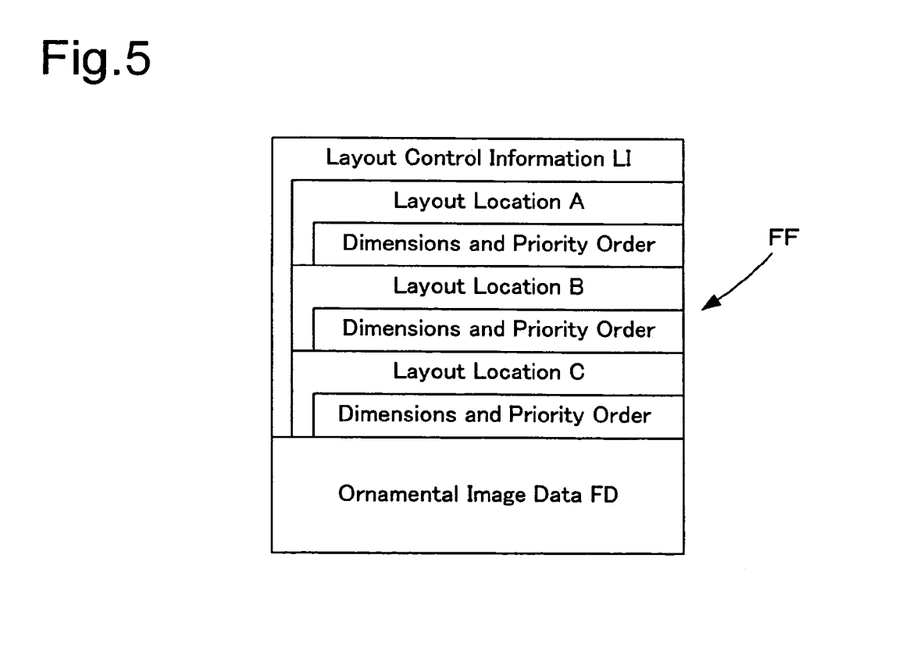
FIG. 5 shows the file structure of a ornamental image file FF including ornamental image data FD and layout control information LI.
Figure 6:
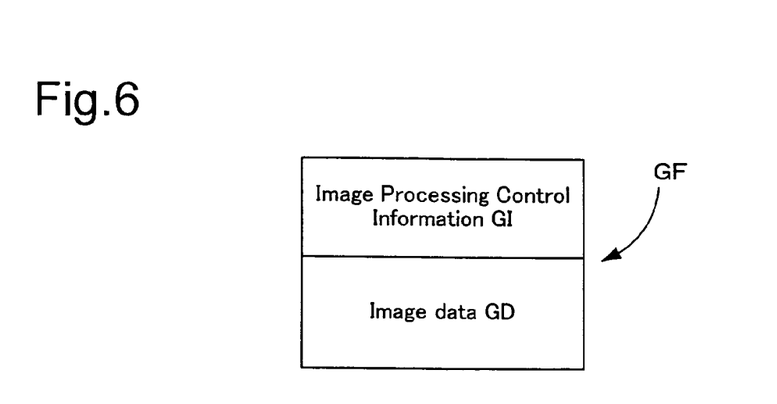
FIG. 6 shows the file structure of an image file GF including image data GD and image processing control information GI.
Figure 7:
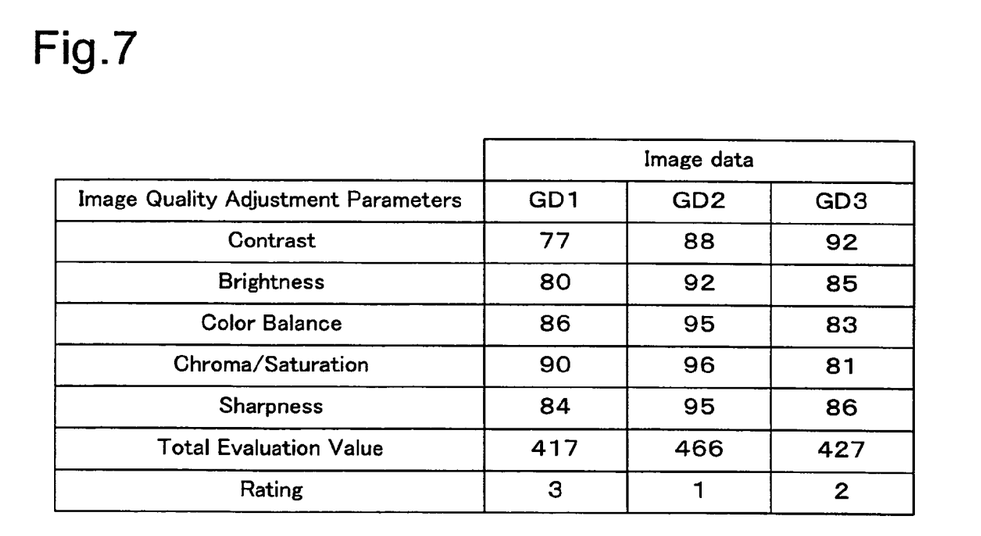
FIG. 7 shows results of evaluation of image data GD1 to GD3 in the first embodiment.
Figure 8:
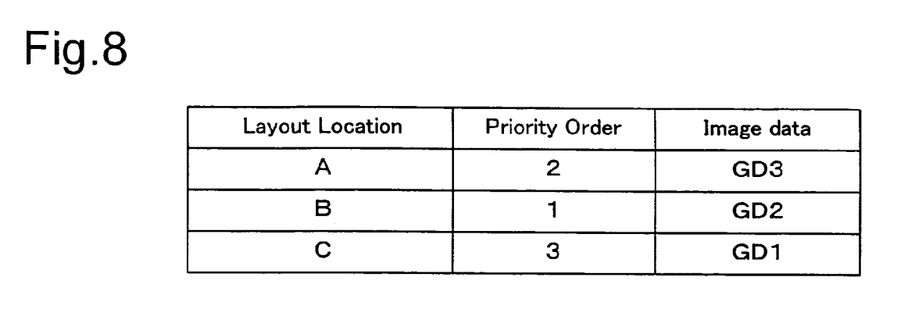
FIG. 8 shows an example of allocation of image data GD to layout locations based on a priority order defined in the layout control information LI and the ratings given by evaluation of the image data GD.

The output image data generation process executed by the personal computer 20 in the first embodiment is described with reference to FIGS. 3 through 8. FIG. 3 is a flowchart showing a routine of the output image data generation process executed by the personal computer 20 in the first embodiment. FIG. 4 shows an example of layout locations and layout dimensions of image data laid out on ornamental image data. FIG. 5 shows the file structure of an ornamental image file FF including ornamental image data FD and layout control information LI. FIG. 6 shows the file structure of an image file GF including image data GD and image processing control information GI. FIG. 7 shows results of evaluation of image data GD1 to GD3 in the first embodiment. FIG. 8 shows an example of allocation of image data GD to layout locations based on the priority order defined in the layout control information LI and the ratings given by evaluation of the image data GD. The layout locations of the image data GD on the ornamental image data FD conceptually show the state of expansion on an image buffer. The file structure of each file conceptually shows the state of storage in a memory.

The output image data generation process of this embodiment may be activated in response to insertion of the memory card MC into the personal computer 20 or in response to connection of the digital still camera 10 to the personal computer 20 via the communication cable. The output image data generation process may otherwise be executed in response to the user's operation of a keyboard to give a start command.

When the output image data generation process starts, the personal computer 20 (CPU 200) first reads selected ornamental image data FD for layout of image data GD and temporarily stores the selected ornamental image data FD in the RAM 201 (step S100). The ornamental image data FD may be selected by the user or may be related in advance to image data GD in the digital still camera 10. The user may select desired ornamental image data FD on the digital still camera 10 or may operate the keyboard to select desired ornamental image data FD among a large number of ornamental image data stored in the HDD 202 on the personal computer 20. The user may alternatively select desired ornamental, image data FD via the network.

The ornamental image data FD gives some ornamental effect to an image and is, for example, a photo frame image data, a photo album (album mounting) image data, or illustration data. The ornamental image data FD has a form shown in FIG. 4 in a resulting output image (in expansion on an image buffer) and includes three layout locations A to C, on which image data are pasted. The ornamental image data FD is transmitted together with the layout control information LI in the form of an ornamental image file FF. The ornamental image file FF has, for example, the file structure of FIG. 5. The layout control information LI includes layout location information (for example, coordinate information) on the respective layout locations A to C for layout of image data GD and information regarding the layout dimensions (resized dimensions) and the priority order of the respective layout locations A to C. The priority order is determined according to the layout locations and the dimensions of the respective layout location areas of the ornamental image data FD. For example, the higher priority is given to the layout location closer to the center of the ornamental image data FD and to the layout location having the greater layout location area.

The layout control information L1 further includes a channel data, which is used to regulate tone values (R, G, and B tone data) of upper image data (for example, ornamental image data FD) located on an upper side in a resulting composite image relative to those of lower image data (for example, image data GD) located on a lower side and thereby determine the transparency of the lower image data against the upper image data. For example, the $\alpha$ channel data applies a coefficient $\alpha$ to the R, G, and B tone data of the upper image data, while applying a coefficient ($1-\alpha$) to the R, G, and B tone data of the lower image data. The $\alpha$ channel data set equal to 255 shows no appearance of the lower image data (opaque) in a resulting composite image, whereas the $\alpha$ channel data set equal to 0 shows perfect appearance of the lower image data (transparent) in a resulting composite image. Semi-transparent ornamental effects are given by setting the $\alpha$ channel data in a range of 0 to 255.

The CPU 200 subsequently reads multiple image data GD from a selected image folder and temporarily stores the multiple image data GD in the RAM 201 (step S110). The user may select a desired image folder or the CPU 200 may arbitrarily (successively) select one image folder from a directory that stores image folders as optional processing objects.

Each image data GD may be related to image processing control information GI to form one image file GF as shown in FIG. 6. The image processing control information GI may be described in a header of the image data GD or may be related to the image data GD by third correlation data. When the image processing control information GI specifies a reduction rate of the difference between a characteristic value and a reference value of each image quality adjustment parameter, that is, a level of auto image quality adjustment, a correction value in the image quality adjustment process is varied according to the reduction rate specified in the image processing control information GI. When the image processing control information GI specifies calculated values of respective image quality adjustment parameters, on the other hand, each calculated value represents a correction value in the image quality adjustment process. The image processing control information GI enables image quality adjustment with correction values reflecting the photographer's requirements.

The CPU 200 analyzes the obtained image data GD to calculate total evaluation values of the respective image data GD (step S120), and rates the respective image data GD based on the calculated total evaluation values (step S130).

The evaluation method of this embodiment evaluates the image qualities of the respective image data GD with regard to the contrast, the brightness, the color balance, the chroma/saturation, and the sharpness among various image quality-relating parameters (image quality adjustment parameters) and computes evaluation values of the respective image data GD. The image data GD used in this embodiment are, for example, RGB data or YCbCr data consisting of a large number of pixel data.

The CPU 200 scans each target image data GD in units of pixels to create a luminance distribution (histogram) of the target image data GD. When the image data GD is RGB data, a luminance y of each pixel data is calculated by an equation of:

$$y = 0.30R + 0.59G + 0.11B$$

When the image data GD is YCbCr data, on the other hand, the luminance y is obtained directly from each pixel data.

The CPU 200 determines a maximum luminance Ymax and a minimum luminance Ymin of each target image data GD, based on the created luminance distribution thereof. The luminance values at specific pixels, which are 0.5% of the total number of pixels deviated inward from both ends of the luminance distribution (that is, a pixel having an actual maximum luminance value and a pixel having an actual minimum luminance value), are set to the maximum luminance Ymax and the minimum luminance Ymin.

Evaluation of Contrast

An evaluation value Econt of each target image data GD with regard to the contrast parameter is calculated from the determined maximum luminance Ymax and minimum luminance Ymin according to equations given below:

$$Econt = 100 + Ydif/255$$

$$Ydif = Ymax - Ymin$$

The greater luminance contrast of the target image data GD (the greater difference between the maximum luminance Ymax and the minimum luminance Ymin) gives the higher evaluation value.

Evaluation of Brightness

Evaluation of the brightness is based on a median Ymed in the created luminance distribution. An evaluation value Ebrgt of each target image data GD with regard to the brightness parameter is calculated from the median Ymed of the luminance distribution and a preset reference medium value Ymed_ref according to an equation given below:

$$Ebrgt = 100 - |Ymed - Ymed\_ref|$$

The calculated evaluation value Ebrgt of less than 0 is fixed to Ebrgt=0. The reference medium value Ymed_ref is, for example, 106, although this value is not restrictive.

Evaluation of Color Balance

The CPU 200 creates histograms (frequency distributions) of the respective color components R, G, and B. According to a concrete procedure, the CPU 200 divides the range of 256 tones into 8 to 16 equal parts (n equal parts) and sums up the frequencies of the respective divisional parts of the tone range. The CPU 200 sets the numbers of pixels (r1, r2, ..., rn), (g1, g2, ... gn), and (b1, b2, ... bn) included in the respective divisional parts of the tone range with regard to the respective color components R, G, and B to characteristic vectors VR, VG, and VB:

$$VR = (r1, r2 \ldots rn) \Sigma ri = 1$$

$$VG = (g1, g2 \ldots gn) \Sigma gi = 1$$

$$VB = (b1, b2 \ldots bn) \Sigma bi = 1$$

The CPU 200 then calculates degrees of similarity between these characteristic vectors according to equations given below:

$$Col\_rg = (VR \cdot VG)/|VR| \cdot |VG|$$

$$Col\_gb = (VG \cdot VB)/|VG| \cdot |VB|$$

$$Col\_rg = (VB \cdot VR)/|VB| \cdot |VR|$$

The degree of similarity takes a value in a range of 0 to 1, where the value closer to 1 represents the higher degree of similarity. An evaluation value Ecol of each target image data GD with regard to the color balance parameter is accordingly calculated from a minimum degree of similarity COL_min (a combination of most different color balances) according to an equation given below:

$$Ecol = 100 \times Col\_min$$

Evaluation of Chroma/Saturation

The chroma/saturation is typically expressed by a deviation (distance) from a reference axis in a uv plane of an Luv color space. The procedure of this embodiment uses a quasi-chroma/saturation X defined below, in order to save the trouble of conversion of the RGB data or the YCbCr data into the Luv color space:

$$X = |G + R - 2R|$$

The CPU 200 creates a histogram (a frequency distribution) of the quasi-chroma/saturation X. The CPU 200 determines a chroma/saturation index S of each target image data GD according to the created histogram. According to a concrete procedure, a chroma/saturation at a specific pixel, which is 16% of the total number of pixels deviated inward from a maximum end in the histogram of the quasi-chroma/saturation X (that is, a pixel having an actual maximum chroma/saturation), is set to the chroma/saturation index S.

An evaluation value Esatu of each target image data GD with regard to the chroma/saturation parameter is calculated from the chroma/saturation index S according to an equation given below:

$$Esatu = 25 \times (S^{1/2})/4$$

The evaluation value Esatu is fixed to 100 when the chroma/saturation index S is greater than 256.

Evaluation of Sharpness

A large luminance difference between adjoining pixel data included in image data GD generally suggests the presence of an edge between the adjoining pixel data. In application of an XY Cartesian coordinate system to the image data GD, an edge differential Ddiff represents an index of luminance difference between adjoining pixel data and is obtained by:

$$Ddiff = |g(x,y)| = (fx^2 + fy^2)^{1/2}$$

Here fx and fy respectively denote a luminance difference in the X direction and a luminance difference in the Y direction:

$$fx = f(x+1, y) - f(x, y)$$

$$fy = f(x, y+1) - f(x, y)$$

The luminance may be expressed by the luminance value Y(x,y) or by the luminance values R(x,y), G(x,y), and B(x,y) with regard to the respective color components R, G, and B.

An average of the edge differentials Ddiff on the contour of each image data GD is used for evaluation of the sharpness of the target image data GD. An average of the edge differentials Ddiff on the whole target image data GD (all the pixels included in the target image data GD) undesirably takes into account the edge differentials Ddiff of the pixels that do not form the contour of the target image data GD. This leads to misevaluation of sharpness.

One typical method of extracting the edge differentials Ddiff on the contour sets an empirically determined edge differential of the contour to a threshold value Ddiff_ref and selects only the edge differentials Ddiff greater than the preset threshold value Ddiff_ref. The CPU 200 accumulates the edge differentials Ddiff greater than the preset threshold value Ddiff_ref and the number of pixels having the greater edge differentials Ddiff and divides the accumulated edge differential Ddiff by the total number of pixels to calculate an average edge differential Ddiff_ave of the contour.

An evaluation value Esha of each target image data GD with regard to the sharpness parameter is calculated from the average edge differential Ddiff_ave according to an equation given below:

$$Esha = 4 \times Ddiff\_ave$$

The calculated evaluation value Esha of greater than 100 is fixed to Esha=100.

FIG. 7 shows an example of the calculated evaluation values of the respective image data GD1 to GD3 with regard to the respective image quality adjustment parameters. The higher rating is given to the image data GD having the greater total evaluation value, which is the sum of the evaluation values of the respective image quality adjustment parameters. In the example of FIG. 7, the first rating, the second rating, and the third rating are respectively given to the image data GD2, the image data GD3, and the image data GD1. The rating may be determined by the evaluation values of selected one or multiple image quality adjustment parameters or by weighting the evaluation values of selected one or multiple image quality adjustment parameters and summing up the evaluation values including the weighted evaluation values.

Referring back to the flowchart of FIG. 3, the CPU 200 obtains layout control information LI (step S140) and determines the priority order of the respective layout locations included in the ornamental image data FD (step S150). In the case of only one ornamental image data FD, the priority order specified in the layout control information LI is directly set to the priority order. In the case of multiple ornamental image data FD, on the other hand, the procedure ranks the identical priority levels of the multiple ornamental image data FD according to the layout locations and the layout dimensions and determines the priority order of all the multiple ornamental image data FD.

The CPU 200 allocates the respective image data GD to the layout locations in the ornamental image data FD, based on the ratings and the priority order as shown in FIG. 8 (step S160). In this embodiment, the number of the image data GD is identical with the number of the layout locations in the ornamental image data FD. The image data GD having the higher rating (the higher total evaluation value) is assigned to the layout location having the higher priority. In the example of FIG. 8, the image data GD2 having the first rating is allocated to the layout location B having the highest priority, the image data GD3 having the second rating is allocated to the layout location A having the second priority, and the image data GD1 having the third rating is allocated to the layout location C having the third priority. The user may manipulate a non-illustrated input unit to change the allocation of the respective image data GD to the layout locations in the ornamental image data FD. The user may change the selection of the image data, as well as the allocation of the selected image data to the layout locations. This ensures selection and layout of image data according to the user's demands.

The CPU 200 subsequently executes image quality adjustment of the respective image data GD allocated to the layout locations (step S170). According to a concrete procedure, the CPU 200 determines a correction value of each image quality adjustment parameter to cancel out or at least reduce a difference between a statistical value (characteristic value) corresponding to the evaluation value of each image data GD and a preset reference value with regard to the image quality adjustment parameter. The CPU 200 adjusts the image quality of the image data GD with the determined correction value. The personal computer 20 stores in advance preset reference values of the respective image quality adjustment parameters in the HDD 202. The image processing control information GI may be reflected on determination of the correction value, when the image data GD is related to the image processing control information GI.

The image quality adjustment uses tone curves (S curves) that correlate input levels to output levels of the respective color components R, G, and B of the image data GD with regard to image quality adjustment parameters, the shadowing, the highlighting, the brightness, the contrast, the color balance, and the memory color correction. In the image quality adjustment with the tone curves, a correction value of each image quality adjustment parameter is used to vary the corresponding tone curves of the R, G, and B color components. A specific point for application of the correction value is set experimentally on each tone curve with regard to each image quality adjustment parameter. The correction value varies the value of the tone curve at the preset specific point and accordingly changes the input-output characteristic of the tone curve. Application of corrected tone curves with regard to the respective color components R, G, and B to the image data GD makes the input-output conversion with regard to the respective color components R, G, and B of the image data GD and thereby gives the image quality-adjusted image data GD.

On conclusion of the image quality adjustment (step S170), the CPU 200 combines the image data GD with the ornamental image data FD according to the layout control information LI to generate resulting output image data (step S180).

One typical method of combining the image data GD with the ornamental image data FD is described. The CPU 200 interprets the script of the layout control information LI describing the layout locations and the layout dimensions, determines the locations and the dimensions of the respective image data GD to be laid out on the ornamental image data FD based on the results of the interpretation, specifies the tone values of the ornamental image data FD according to the α channel data, and combines the image data GD with the ornamental image data FD. The CPU 200 resizes (contracts or expands) the dimensions of the respective image data GD according to the layout dimensions of the respective layout locations described in the script.

The CPU 200 applies the α channel data and sums up the R, G, and B values of the respective image data to calculate the R, G, and B values of resulting output image data. The α channel data is set equal to 0 to prevent interference of the ornamental image data FD with reproduction of the image data GD in the area of an image in a resulting output image (composite image). The α channel data is set equal to 255 to prohibit reproduction of the image data GD in the area of an ornamental image (an ornamental area or a frame area) in the resulting output image.

The CPU 200 determines whether any user's change request is entered from an input unit, such as a keyboard or a mouse (step S190). In the case of no entry of the user's change request (step S190: No), the program goes to step S200.

In the case of entry of any user's change request (step S190: Yes), on the other hand, the CPU 200 changes the selection of the image data and the layout locations of the selected image data according to the user's specification (step S195) and repeats the processing of steps S170 and S180. The user's demands are accordingly reflected on the selection of the image data to be laid out in the ornamental image data and the layout locations of the image data in the ornamental image data.

The CPU 200 outputs resulting output image data to a printer driver or a display driver (step S190) and terminates this processing routine. The printer driver executes RGB to CMYK color conversion based on lookup tables, halftoning, and other required series of image processing and eventually sends the output image data with print control commands as raster data to the printer 30.

As described above, the personal computer 20 as the output image data generating device of the first embodiment evaluates the image qualities of respective image data GD for rating and sequentially allocates the image data GD having the higher rating to the layout location having the higher priority. The user is thus required to only specify (select) ornamental image data and multiple image data GD for pasting. Such simple specification enables the image data GD of the higher image quality levels to be readily pasted in the respective layout locations of the ornamental image data FD.

The image data GD of the higher image quality level is placed in the layout location of the higher priority, that is, the layout location of the greater importance that is closer to the center of the ornamental image data FD. This gives a resulting composite image (output image) of the objective images with the ornamental image as the high-quality output result.

Arrangement of high-quality (clear) objective images on the main layout locations in a ornamental image gives a resulting output image (ornamental image+objective images) of the impressive page layout.

Second Embodiment

Figure 9:
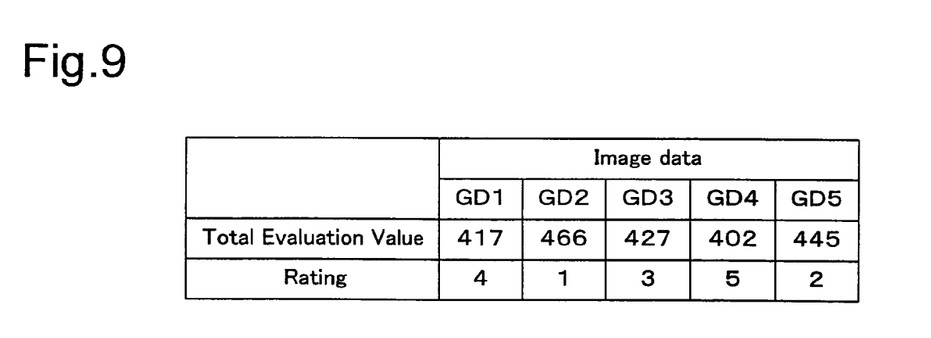
FIG. 9 shows an example of ratings of image data GD1 to GD5 in the second embodiment.
Figure 10:
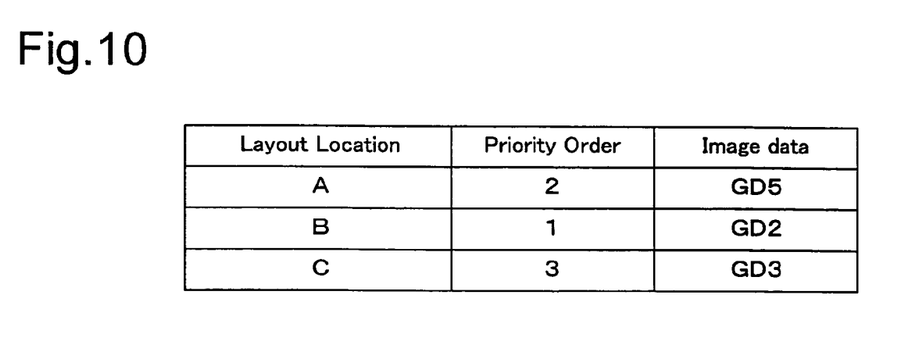
FIG. 10 shows an example of allocation of image data GD to layout locations based on a priority order defined in the layout control information LI and the ratings given by evaluation of the image data GD in the second embodiment.

An output image data generation process of a second embodiment is described with reference to FIGS. 9 and 10. FIG. 9 shows an example of ratings of image data GD1 to GD5 in the second embodiment. FIG. 10 shows an example of allocation of image data GD to layout locations based on the priority order defined in the layout control information LI and the ratings given by evaluation of the image data GD in the second embodiment. The output image data generation process of the second embodiment is similar to the output image data generation process of the first embodiment, except that the number of the image data GD is greater than the number of layout locations in the ornamental image data FD. The following description accordingly regards only the difference from the output image data generation process of the first embodiment. The structure of the personal computer in the second embodiment is identical with the structure of the personal computer 20 in the first embodiment. The like elements are thus expressed by the like numerals and are not specifically described here.

The output image data generation process of the second embodiment modifies the processing of step S160 in the output image data generation process of the first embodiment. The procedure of the second embodiment selects an image folder including five image data GD1 to GD5 and evaluates the image qualities of the respective image data GD1 to GD5. The result of the image quality evaluation is shown in FIG. 9. The first rating to the fifth rating are given to the image data GD2, GD5, GD3, GD1, and GD4 in this order.

The CPU 200 allocates the respective image data GD to the layout locations in the ornamental image data FD according to the ratings and the determined priority order as shown in FIG. 10. In the second embodiment, the number of the layout locations in the ornamental image data FD is equal to 3, which is less than the number of the image data GD. The image data GD having the higher ratings (higher total evaluation values) are sequentially allocated to the layout locations having the higher priorities. No layout locations are thus assigned to the image data GD1 and GD4 having the fourth rating and the fifth rating. Namely the image data GD1 and GD4 are not laid out in the ornamental image data FD nor included in a resulting output image data.

As described above, in addition to the effects of the first embodiment, the output image data generation process of the second embodiment preferentially includes the image data GD of the higher image quality in the resulting output image data, when the number of the image data GD is greater than the number of layout locations included in the ornamental image data. This gives a resulting composite image of the high-quality objective images with the ornamental image as the output result.

In general, the image data GD of the higher total evaluation value has the higher original image quality and the smaller requirement level of correction and accordingly gives a high-quality corrected image. The image data GD of the lower total evaluation value, on the contrary, has the lower original image quality and the greater requirement level of correction. Correction of such lower-quality image data does not significantly improve the image quality of the resulting image. When the number of the image data GD is greater than the number of layout locations in the ornamental image data, sequential allocation of the image data GD having the higher ratings to the layout locations gives an impressive, high-quality output image.

Modifications

In the embodiments discussed above, the personal computer 20 is adopted as the image processing device to execute the series of image processing. The image processing device is, however, not restricted to the personal computer but may be, for example, a standalone printer or a standalone display device having the image processing functions to execute the series of image processing. The technique of the invention is also attained by a printer driver, a video driver, and an image processing application program without the hardware configuration of the image processing device. The display device includes CRTs, liquid crystal displays, and projectors that have the image quality adjustment function with regard to image data and are capable of displaying a resulting output image according to the quality-adjusted image data GD.

All or part of the output image data generation process may be executed by the digital still camera 10, in place of the personal computer PC. In this case, the output image data generation function discussed in the first embodiment or in the second embodiment is added to an image data processing application program, for example, a retouch application program or a printer driver stored in a ROM of the digital still camera 10.

Print data, which include output image data and print control commands and are generated by the digital still camera 10, are given to the printer 30 via the cable or via the memory card MC. The printer 30 receives the print data and creates a dot pattern on a printing medium according to the received print data to output a printed image. The digital still camera 10 may alternatively give output image data to the personal computer 20 or the printer 30. The personal computer 20 or the printer 30 then generates print data including print control commands.

In the above embodiments, the output image data generation process is executed by the software or the computer program. The output image data generation may alternatively be attained by a hardware circuit including logic circuits of respective processing steps. This modified structure relieves the process load of the CPU 200 and ensures the higher-speed output image data generation. The hardware circuit of the output image data generation is mounted, for example, as a packaged circuit in the digital still camera 10 and the printer 30 or as an add-on card in the personal computer 20.

In the first and the second embodiments discussed above, the locations of the respective image data GD are determined according to the priority order of the layout locations in the ornamental image data and the ratings of the respective image data GD. One modified procedure may use only the ratings of the respective image data GD and allocate the respective image data GD to arbitrary layout locations. This method places at least the image data of the higher image quality levels in the layout locations of the ornamental image data.

In the embodiments discussed above, the priorities of the respective layout locations in the ornamental image data are determined according to the priority order specified in the layout control information L1. The priorities may alternatively be determined according to the layout locations and the layout dimensions specified in the layout control information LI. For example, the higher priority is given to the layout location that has the larger layout dimensions and is positioned closer to the center of the ornamental image data FD.

The evaluation method of the image data GD described in the first embodiment is only one example, and any other suitable technique may be applied to evaluate the image quality of the image data GD.

The output image data generating device, the output image data generating method, and the output image data generating program of the invention are described in detail with reference to some embodiments. These embodiments discussed above are, however, to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

The Japanese patent application as the basis of the priority claim of the parent application is incorporated in the disclosure hereof by reference:

(1) Japanese Patent Application No. 2003-318056 (filing date: Sep. 10, 2003).

What is claimed is:

1. A device comprising:
one or more processors;
memory;
a layout location assignment module configured to obtain plural image layout locations on a frame image, and allocate multiple images to the plural image layout locations; and
an output module configured to output a composite image of the frame image and the multiple images,
wherein the layout location assignment module determines one image having a highest image quality among the multiple images, and allocates the one image having the highest image quality to one image layout location having a highest priority among the plural image layout locations, and
wherein the layout location assignment module uses respective color components R, G, and B of a target image to be processed, among the multiple images, to calculate a quasi-chroma/saturation X according to an equation given below:

$$X=|G+R-2R|,$$

creates a histogram of the quasi-chroma/saturation X, determines a chroma/saturation at a specific pixel, which is 16% of the total number of pixels deviated inward from a maximum end in the histogram of the quasi-chroma/saturation X, and corresponds to a pixel having an actual maximum chroma/saturation, as a chroma/saturation index S, calculates an evaluation value Esatu of saturation according to an equation given below using the chroma/saturation index S:

Esatu=$25 \times (S^{1/2})/4$, where the evaluation value Esatu is fixed to 100 when the chroma/saturation index S is greater than 256, and determines an image having a greatest calculated evaluation value Esatu of saturation as the image having the highest image quality.

2. A device in accordance with claim 1,
wherein the image quality is evaluated by using one or more of contrast, brightness, color balance, chroma/saturation, and sharpness.

3. A device in accordance with claim 1,
wherein the layout location assignment module determines a maximum luminance Ymax and a minimum luminance Ymin of a target image to be processed, among the multiple images, calculates an evaluation value Econt of a luminance contrast according to equations given below using the determined maximum luminance Ymax and minimum luminance Ymin:

$$Econt=100 \times Ydif/255$$

$$Ydif=Ymax-Ymin, \text{ and}$$

determines an image having a greatest calculated evaluation value Econt of the luminance contrast as the image having the highest image quality.

4. A device in accordance with claim 1,
wherein the layout location assignment module determines a median Ymed of a luminance distribution of a target image to be processed, among the multiple images, calculates an evaluation value Ebrgt of a brightness according to an equation given below using the calculated median Ymed of the luminance distribution and a preset reference medium value Ymed_ref:

$$Ebrgt=100-|Ymed-Ymed\_ref|, \text{ and}$$

determines an image having a greatest calculated evaluation value Ebrgt of the brightness as the image having the highest image quality.

5. A device in accordance with claim 1,
wherein the layout location assignment module determines the following characteristic vectors VR, VG, and VB composed of respective numbers of pixels (r1, r2, ... rn), (g1, g2, ... gn), and (b1, b2, ... bn) in multiple tone ranges, with regard to respective color components R, G, and B of a target image to be processed, among the multiple images:

$$VR=(r1,r2, \ldots rn) \Sigma ri=1$$

$$VG=(g1,g2, \ldots gn) \Sigma gi=1$$

$$VB=(b1,b2, \ldots bn) \Sigma bi=1,$$

calculates degrees of similarity between the characteristic vectors according to equations given below:

$$Col\_rg=(VR \cdot VG)/|VR| \cdot |VG|$$

$$Col\_gb=(VG \cdot VB)/|VG| \cdot |VB|$$

$$Col\_rg=(VB \cdot VR)/|VB| \cdot |VR|,$$

calculates an evaluation value Ecol of a color balance according to an equation given below using a minimum degree of similarity COL_min that is a combination of most different color balances:

$$Ecol=100 \times Col\_min, \text{ and}$$

determines an image having a greatest calculated evaluation value Ecol of the color balance as the image having the highest image quality.

6. A device in accordance with claim 1, wherein the layout location assignment module, when an edge differential Ddiff represents an index of luminance difference between adjoining pixel data, extracts the edge differentials Ddiff greater than a threshold value Ddiff_ref as the edge differentials Ddiff constituting an contour, accumulates the edge differentials Ddiff greater than the threshold value Ddiff_ref and the number of pixels corresponding to the edge differentials Ddiff and divides the accumulated edge differential Ddiff by the total number of pixels to calculate an average edge differential Ddiff_ave of the contour, calculates an evaluation value Esha of sharpness according to an equation given below using the average edge differential Ddiff_ave:

Esha=4×Ddiff_ave, where the evaluation value Esha of greater than 100 is fixed to Esha=100, and determines an image having a greatest calculated evaluation value Esha of sharpness as the image having the highest image quality.

7. A computer-implemented method comprising:

obtaining plural image layout locations on a frame image;

with respect to the plural image layout locations, determining one image having a highest image quality among the multiple images;

allocating the determined one image having the highest image quality to one image layout location having a highest priority among the plural image layout locations; and outputting a composite image of the frame image and the multiple images, wherein the determining one image having the highest image quality among the multiple images is implemented by calculating a quasi-chroma/saturation X according to an equation given below, with respect to a target image to be processed among the multiple images:

$$X=|G+R-2R|,$$

creating a histogram of the quasi-chroma/saturation X, determining a chroma/saturation at a specific pixel, which is 16% of the total number of pixels deviated inward from a maximum end in the histogram of the quasi-chroma/saturation X, and corresponds to a pixel having an actual maximum chroma/saturation, as a chroma/saturation index S, calculating an evaluation value Esatu of saturation according to an equation given below using the chroma/saturation index S:

Esatu=25×($S^{1/2}$)/4, where the evaluation value Esatu is fixed to 100 when the chroma/saturation index S is greater than 256, and determining an image having a greatest calculated evaluation value Esatu of saturation as the image having the highest image quality.

8. A method in accordance with claim 7, wherein the determining one image having the highest image quality among the multiple images is implemented by determining a maximum luminance Ymax and a minimum luminance Ymin of a target image to be processed, among the multiple images, calculating an evaluation value Econt of a luminance contrast according to equations given below using the determined maximum luminance Ymax and minimum luminance Ymin:

$$Econt=100 \times Ydif/255$$

$$Ydif=Ymax-Ymin, \text{ and}$$

determining an image having a greatest calculated evaluation value Econt of the luminance contrast as the image having the highest image quality.

9. A method in accordance with claim 7, wherein the determining one image having the highest image quality among the multiple images is implemented by determining a median Ymed of a luminance distribution of a target image to be processed, among the multiple images, calculating an evaluation value Ebrgt of a brightness according to an equation given below using the calculated median Ymed of the luminance distribution and a preset reference medium value Ymed_ref:

$$Ebrgt=100-|Ymed-Ymed\_ref|, \text{ and}$$

determining an image having a greatest calculated evaluation value Ebrgt of the brightness as the image having the highest image quality.

10. A method in accordance with claim 7, wherein the determining one image having the highest image quality among the multiple images is implemented by determining following characteristic vectors VR, VG, and VB composed of respective numbers of pixels (r1, r2, ... rn), (g1, g2, ... gn), and (b1, b2, ... bn) in multiple tone ranges, with regard to respective color components R, G, and B of a target image to be processed, among the multiple images:

$$VR=(r1,r2,\ldots rn)\Sigma ri=1$$

$$VG=(g1,g2,\ldots gn)\Sigma gi=1$$

$$VB=(b1,b2,\ldots bn)\Sigma bi=1,$$

calculating degrees of similarity between the characteristic vectors according to equations given below:

$$Col\_rg=(VR \cdot VG)/|VR| \cdot |VG|$$

$$Col\_gb=(VG \cdot VB)/|VG| \cdot |VB|$$

$$Col\_rg=(VB \cdot VR)/|VB| \cdot |VR|,$$

calculating an evaluation value Ecol of a color balance according to an equation given below using a minimum degree of similarity COL_min which is a combination of most different color balances:

$$Ecol=100 \times Col\_min, \text{ and}$$

determining an image having a greatest calculated evaluation value Ecol of the color balance as the image having the highest image quality.

11. A method in accordance with claim 7, wherein the determining one image having the highest image quality among the multiple images is implemented by when an edge differential Ddiff represents an index of luminance difference between adjoining pixel data, extracting the edge differentials Ddiff greater than a threshold value Ddiff_ref as the edge differentials Ddiff constituting an contour, accumulating the edge differentials Ddiff greater than the threshold value Ddiff_ref and the number of pixels corresponding to the edge differentials Ddiff and dividing the accumulated edge differential Ddiff by the total number of pixels to calculate an average edge differential Ddiff_ave of the contour, calculating an evaluation value Esha of sharpness according to an equation given below using the average edge differential Ddiff_ave:

Esha=4×Ddiff_ave, where the evaluation value Esha of greater than 100 is fixed to Esha=100, and determining an image having a greatest calculated evaluation value Esha of sharpness as the image having the highest image quality.

\* \* \* \* \*